United States Patent
Brookler

(10) Patent No.: US 7,805,666 B2
(45) Date of Patent: Sep. 28, 2010

(54) MULTI-LAYERED DATA MODEL FOR DETERMINING IMAGE CHOICE ACROSS A SET OF AUDIENCE-SPECIFIC DOCUMENTS

(75) Inventor: David Brookler, Los Angeles, CA (US)

(73) Assignee: SAP, AG, Waldorf (DE)

( * ) Notice: Subject to any disclaimer, the term of this patent is extended or adjusted under 35 U.S.C. 154(b) by 1035 days.

(21) Appl. No.: 11/204,743

(22) Filed: Aug. 15, 2005

(65) Prior Publication Data

US 2006/0288265 A1 Dec. 21, 2006

(51) Int. Cl.
*G06F 17/00* (2006.01)
(52) U.S. Cl. ............. 715/200; 715/234; 715/277; 715/255; 715/229
(58) Field of Classification Search ............. 715/234, 715/209, 262, 200, 229, 255, 277
See application file for complete search history.

(56) References Cited

U.S. PATENT DOCUMENTS

| | | | | |
|---|---|---|---|---|
| 5,850,118 A | * | 12/1998 | Toda .................. | 310/313 R |
| 5,956,737 A | * | 9/1999 | King et al. ............. | 715/202 |
| 6,418,439 B1 | * | 7/2002 | Papierniak et al. ...... | 707/9 |
| 6,532,442 B1 | | 3/2003 | Schumacher et al. | |
| 6,623,529 B1 | * | 9/2003 | Lakritz ............... | 715/205 |
| 7,165,239 B2 | * | 1/2007 | Hejlsberg et al. ....... | 717/114 |
| 2002/0069049 A1 | * | 6/2002 | Turner ................ | 704/8 |

* cited by examiner

*Primary Examiner*—Thu Huynh
(74) *Attorney, Agent, or Firm*—Cotman IP Law Group, PLC

(57) ABSTRACT

A multi-layered data model for determining image choice across a set of audience-specific documents comprising language, regional, regulatory and/or cultural differences. Enables generation of audience-specific documents with audience specific images and audience-specific image placement based on inheritance of images and image metadata associated with hierarchical audiences. For data entry, enables a user to rapidly determine if images in an audience specific document conform to the expectations or requirements of an intended audience. The data entry and edit interface distinguishes between current and inherited audience levels through the use of color or any other mechanism that allows a user to quickly identify data that is missing and needs to be populated, changed or remain unchanged if the inherited image or image title or placement is suitable for the given audience. Documents are generated to any number of media types such as HTML, XML and paper.

20 Claims, 4 Drawing Sheets

Figure 2

| | English [US] | English [UK] | Japanese [JA] |
|---|---|---|---|
| Description | Kodachrome Professional Slide Film | Kodachrome Professional Slide Film | Kodachrome の専門のスライドのフィルム |
| Category | Professional Slide Film | Professional Slide Film | 専門のスライドのフィルム |
| Manufacturer | Kodak | Kodak | Kodak |
| Long Description | Long the leader in variety and Excellent natural color quality with | Long the leader in variety and Excellent natural color quality with | 変化及び技術、コダックの長くリーダーは Excellent natural color quality with superior |
| Pictures | [image] | [image] | [image] |
| Spec Sheets | | | |

Tabs: Record Detail | Language Detail | Family Detail | Validations | Workflow | Search Selections 200 — Description
201 — Category
202 — Manufacturer
203 — Long Description
204 — Pictures
250

Figure 3

The Audience Layer Operator with Multiple Audience Layers

| language layer | True if... | | | | | | | | |
|---|---|---|---|---|---|---|---|---|---|
| | Non-Lookup / Lookup Field | | | | | | | | Multi-Valued Lookup Field |
| | 0 | 1 | 2 | 3 | 4 | 5 | 6 | 7 | <across the set of all links> |
| has value | | | | | • | • | • | • | no missing values |
| is missing value | • | • | • | • | | | | | any missing value |
| inherits primary | | | • | • | | | | | any inherits primary |
| inherits secondary | | • | | | | | | | any inherits secondary |
| inherits any | | • | • | • | | | | | any inherits any |
| does not inherit | • | | | | • | • | • | • | no inherited values |

MULTI-LAYERED DATA MODEL FOR DETERMINING IMAGE CHOICE ACROSS A SET OF AUDIENCE-SPECIFIC DOCUMENTS

BACKGROUND OF THE INVENTION

1. Field of the Invention

Embodiments of the invention described herein pertain to the field of computer systems. More particularly, but not by way of limitation, one or more embodiments of the invention provide a multi-layered data model for determining image choice across a set of audience-specific documents comprising language, regional, regulatory and/or cultural differences.

2. Description of the Related Art

Generating a document for multiple audiences wherein each document is made available in multiple media types using current technology is a time consuming and expensive undertaking. There are no known systems that allow for intelligent selection, positioning and titling of images based on an intended audience. Audiences may have unique language, regional, regulatory and/or cultural characteristics but may be similar and may make use of large portions of the data associated with a similar audience. Media type may comprise markup based documents that are capable of being displayed in a web browser and may also comprise print based media such as for example a paper based catalog.

A document that is targeted to more than one language may also need to take into account the different regional, regulatory, and cultural requirements of the audience for which the document is published. For an audience that is similar to another audience, there is a significant amount of duplicate data entry in addition to the specific modifications required for each intended audience. When underlying data changes, it is not necessarily clear as to what data should be updated in each audience specific document since a specific piece of data may have already been changed to conform to a specific audience. In addition, the generated document needs to be properly formatted regardless of the media type for which the document is generated. Formatting the document for each media type is also time consuming and requires large amounts of maintenance when the data in each version of the document changes further requiring checking the generated documents in each media type to ensure proper formatting. Selection of images based on the intended audience is generally performed by hand.

Current systems for generating documents simply do not provide an easy method for generating multi-audience documents that comprise intelligent selection, positioning and titling of images for multiple output media types. When publishing documents for a global audience, an image that is an appropriate substitute in one instance of the document may not be an adequate substitute in a different instance. French regulations, for instance, prohibit imagery that shows a hypodermic needle whereas in other countries such images are permissible. The same concept is also applicable to language, cultural, and regional or regulatory requirements associated with a particular document. Current systems provide mechanisms for publishing documents in multiple languages, but require brute force entry of multi-lingual data including images in a way that tends require large amounts of duplicate operator entries for similar languages, cultural, regional or regulatory specific embodiments of a document. For example, current systems require a complete set of entries for two languages and the associated images even though they may only differ in a small way such as United Kingdom and United States English versions of a document. In addition, the interfaces of the systems allowing for data entry cannot provide visual clues as to the images used or missing for a given audience since there is no concept of inheritance in current systems. Hence, current systems for generating documents fail to enable the user to determine whether or not a document and its associated images conforms to the expectations or requirements of its intended audience in a visual manner that allows a user to quickly ensure that each regional, regulatory and cultural difference is accounted for in the final generated document.

Furthermore, generating a document for alternate media types requires data that defines the required output format for the particular media type. Current systems that perform this function are generally hardcoded and when a particular piece of data such as in image changes, all target media documents must be manually adjusted and further adjusted for each media output type as well.

For at least the limitations described above there is a need for a system that quickly enables a user to determine whether or not the images associated with a document conforms to the expectations or requirements of its intended audience.

SUMMARY OF THE INVENTION

One or more embodiments of the invention provide a multi-layered data model for determining image choice across a set of audience-specific documents comprising language, regional, regulatory and/or cultural differences. Embodiments of the invention allow a user to rapidly determine if the images in an audience specific document conform to the expectations or requirements of an intended audience. The word "audience" for the purposes of this specification means a group of document consumers such as people or computers that are associated with a language, country, region, regulation or culture. One or more embodiments of the invention comprise an interface that makes use of rule-based inheritance in creating and editing data used in generating a document targeted at a plurality of audiences. For example, the system distinguishes between current audience layer values, primary audience inheritance values, and secondary audience inheritance values through the use of color or any other mechanism that allows a user to quickly identify data that is missing and needs to be populated, changed or remain unchanged if the inherited data is suitable for the given audience. In the case of an image, the image may be outlined with a particular color to indicate its inheritance level. Any other method of indicating the level of inheritance is in keeping with the spirit of the invention. Using the interface described, users can determine at a glance what information is inherited and what level of inheritance a given image is from. The use of the layers of inheritance is exemplary and the use of more or less than the three layers of inheritance described is in keeping with the spirit of the invention.

Before generating an audience specific document targeted at a particular media type, an audience hierarchy may be created and utilized for entry and edit of data including images for a desired audience. The audience hierarchy may be implemented as a tree or linear structure or any other structure comprising at least one entry so that at least one audience may be used in obtaining data from a data attribute table. For example when obtaining a data value for a particular audience, if that value does not exist for that audience then the audience hierarchy may be utilized to find the data value for an inherited audience. In the case of images, the image itself or other metadata associated with the image such as position, title or any other data may be garnered for a particular audience. By adding regional, cultural or regulatory subdivisions within the audience hierarchy and inheriting large portions of existing audience specific data entries, a large number of audience specific documents may be generated with a minimal amount of data entry required. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values such as images are automatically available to audiences in the same hierarchy. The main data table is not altered when adding an audience, attributes are added where needed to the attribute table and an audience is defined in the audience table.

Once the audience hierarchy is set up, entry and edit of data occurs in one or more embodiments of the invention after selecting a given audience identifier for interaction with the system. The audience identifier may be entered manually or automatically from the user or computer associated with a user. The audience identifier may specify the language, or the language and country, or the language, country and region, or the language, region and culture, or the culture and regulatory area or any other combination of audience identifying values. A document may be published at any time using the data including images that have been entered and edited in the system.

Entry of data such as text and images for a given audience may comprise entering a small amount of data if the audience may be based extensively on another audience. By viewing the data and the associated color or other visual representation associated with an audience, the minimal amount of data entries may be made to take advantage of other existing audience data. The visual representation may involve the color black for the primary layer, green for the first inheritance layer and red for a secondary inheritance layer. In this case, when viewing the data under a current audience setting, text for another audience that is inherited from the current audience would be green, and text for an audience that uses the current audience data as a secondary inheritance layer would be red. Pictures that are inherited may be surrounded by a black, green or red border to depict their inheritance level for example. Any other method of visually displaying the different levels of inheritance is in keeping with the spirit of the invention such as for example showing the current audience layer in bold type, the primary inheritance audience layer in regular type and the secondary inheritance audience layer in italic. In the case of images, any other metadata such as titles or image parameters may be shown in alternate colors, fonts or font densities or sizes.

Data integrity is maintained in one or more embodiments of the invention through legal value lists during data entry, limited value lists during searches, predefined measurement fields and attributes, color coded field values, the ability to search for NULL values using drill down or free-form search, usage tabs that show the set of records to which each object is linked or to the categories to which an attribute is linked, in-place taxonomy editing, automatic change detection for determining if a change would alter the integrity of the data and product masks that allow for subsets of the master data to be published without requiring duplicate data entry for each publication. In addition to these methods of maintaining data integrity, inheritance value promotion is utilized in order to minimize the amount of data required for entry to support the desired audiences.

Keyword searching may be utilized in one or more embodiments to search only the current audience layer and the primary inherited audience layer. This allows for searching in what will be the generated document data only. Other embodiments of the invention allow for the level in which to keyword search to be set to any desired level. In multi-audience data sets, use of an "is NULL" operator when searching returns non-lookup fields that have all associated audience inheritance levels set to NULL or lookup fields that do not link to a sub-table. One or more embodiments of the invention may comprise complete control over the exact layer in which to search for NULL values using a bit flag in the search. For a three level inheritance embodiment, there are 8 permutations involving a NULL value in at least one of the layers, instead of making the user calculate the proper mask, the Current Audience Layer mask can be logical ORed with the Primary Audience Layer Mask or the Secondary Audience Layer Mask in order to create the desired search combination. In addition, predefined audience layer operators may also be used comprising "has value", "is missing value", "inherits primary", "inherits secondary", "inherits any", "does not inherit". "Has value" and "is missing value" are complementary functions used to determine if the current audience layer comprises a value or whether the converse is true. For lookup fields these functions are used in order to check for values or missing values across the set of all links. "Inherits primary" returns a match when the current audience layer inherits a value from either the primary or secondary audience layer and "inherits secondary" returns a match when the current audience layer inherits from only the secondary audience layer, while "inherits any" returns a match when either of the previous two cases is true. "Does not inherit" returns a match when there is a current audience layer value for non-lookup fields or when all layers are null. In this manner it is possible to search for images that have been inherited from a variety of levels and return all of the records that for example inherit from the secondary audience layer. This speeds the validation process for a document.

When importing data, the import can be directed to a particular audience layer. In this manner the supported audiences may be built up from external programs or data sources and independently entered into the system. Exporting data may comprise exporting a particular audience layer or exporting all audience layers. Import and export may make use of existing file formats and applications from various software manufacturers.

One or more embodiments of the invention may utilize database tables or memory structures or any combination of tables or structures in storing data associated with audiences or data relating to the audience metadata. Audience specific documents may be generated for publication by obtaining an audience identifier from an audience order table or structure. The audience identifier specifies the actual audience to utilize when accessing a data attribute table or data table comprising values for at least one audience. The value specific to a given audience is obtained from the data table using the first audience order identifier and the reference identifier of the value from a main data table. If the value exists, it is returned. If the value does not exist for a given audience order identifier and reference, then the audience order table may be accessed in order to find the next audience that may comprise the value. The next position found in the audience order table for a given audience identifier is utilized in order to access the data table. The processing repeats until a value is found or a stop flag is found in which case no value is supplied. Stop flags may be utilized in the audience hierarchy to allow for a user interface data entry and editing application to show all inherited values and yet allow for the non-publication of inherited values past a set level of inheritance in a generated document. Although the system utilized for data entry and edit may show secondary inheritance audience layers in red for example, the generated document itself may not be generated using any secondary inheritance values based on user choice.

Adding support for document for a given audience using embodiments of the invention is rapid as there is no need to add multiple rows for each entry in the main data table or add and populate fields in a main data table for each new audience. The data attribute table may be augmented with only those images and/or image descriptors that are unique to the new audience with respect to a set of images and/or image descriptors corresponding to an pre-existing audience. Since values for different audience inheritance levels are shown with different visual representations, the choice of data to enter or edit is performed by determining whether inherited values for a given audience are appropriate for the current audience. Edit of a primary inherited layer data value converts the entry to a current layer value since the data value entered no longer inherits from another layer, therefore the visual representation of the data value changes to reflect this level advancement.

BRIEF DESCRIPTION OF THE DRAWINGS

FIG. 2 illustrates an audience detail view for an embodiment of the data entry and edit application showing image choice for a plurality of audience layer data values.

FIG. 3 illustrates the audience layer operator for searching multiple audiences.

DETAILED DESCRIPTION OF THE INVENTION

A multi-layered data model for determining image choice across a set of audience-specific documents comprising language, regional, regulatory and/or cultural differences will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
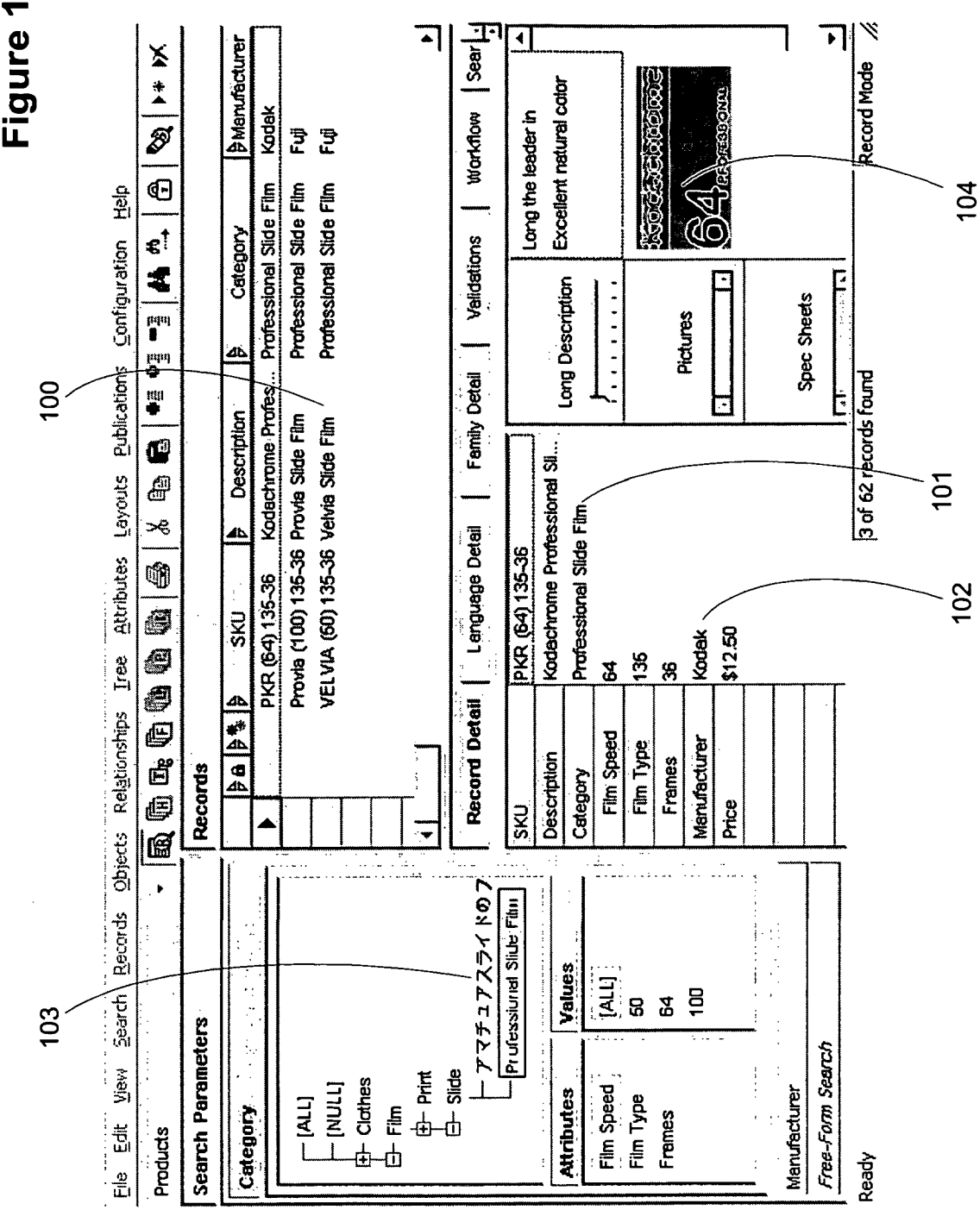
FIG. 1 illustrates a record view for an embodiment of the data entry and edit application comprising a plurality of audience layer data values.

FIG. 1 illustrates a record view for an embodiment of the data entry and edit application comprising a plurality of audience layer data values. This view illustrates an interface for indicating the presence of inherited values including images in a document. Description value 100 for example may be green in order to show that the value is inherited from another audience layer. The current record selected is shown in the bottom right area of the screen shot. Category value 101 may also be in green to denote that the value is inherited from another audience layer along with Manufacture value 102. Category value 103 may be displayed in red to indicate that there is no current audience layer value, or no primary inheritance layer value. This could also be true of any of the other data values or metadata values displayed. Thus, the interface enables a user to rapidly determine if an audience specific document conforms to the expectations or requirements of an intended audience. Image 104 may comprise a green border for example to show that the image is being obtained from the primary inheritance layer.

FIG. 2 illustrates an audience detail view for an embodiment of the data entry and edit application comprising a plurality of audience layer data values. The interface makes use of rule-based inheritance in creating and editing data used in generating a document targeted at a plurality of audiences. One or more embodiments of the invention comprise a user interface that distinguishes between current audience layer values as shown in the English [US] column, primary audience inheritance values as shown in the English [UK] column, and secondary audience inheritance values shown in the Japanese [JA] column. In this example, English [US] is the current audience layer, English [UK] is the primary audience layer and Japanese [JA] is the secondary audience layer. Entirely different images may be used for each audience, or in this case, the background of the image under a given audience layer such as the Japanese [JA] layer may be a different shade that is more culturally accepted (not shown for ease of illustration). Through the use of color or any other mechanism that allows a user to quickly identify data that is missing and needs to be populated, changed or remain unchanged if the inherited data is suitable for the given audience. Using the interface described, users can determine at a glance what information is inherited and what level of inheritance that information is from. Assuming that the current audience setting is English [US] for example, the English [US] column comprises data values that may generally be all black if the English [US] audience is the predominantly populated audience. Certain values may appear green or red if for example they are not found in the English [US] layer and are obtained from another audience layer. This applies to Description values 200, Category values 201, Manufacturer values 202 and Long Description values 203 or any other text based values the column may comprise. Picture values 204 may comprise borders around the pictures that are black, green or red to indicate the audience layer that they are inherited from. As the images illustrated in FIG. 2 comprise English text, they in general would be different images comprising the language associated with the audience. One or more embodiments of the invention may comprise an audience detail tab as opposed to a language detail tab if the audiences are split based on characteristics other than simply language.

Before entering and editing the data for an audience specific document targeted at a particular media type, an audience hierarchy may be created and utilized for entry and edit of data for a desired audience data. The audience hierarchy may be implemented as a tree or linear structure or any other structure comprising at least one entry so that at least one audience may be used in obtaining data from a data attribute table. For example when obtaining a data value for a particular audience, if that value does not exist for that audience then the audience hierarchy may be utilized to find the data value for an inherited audience. By adding regional, cultural or regulatory subdivisions within the audience hierarchy and inheriting large portions of existing audience specific data entries, a large number of audience specific documents may be generated with a minimal amount of data entry required. Use of images from related audiences allows for images to be used in a wider arena than is generally allowed for text since text is tied to a language and images are less constrained. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. The main data table is not altered when adding an audience, attributes are added where needed to the attribute table and an audience is defined in the audience table. When running the application for data entry and edit, and before generating a document, secondary inheritance values may be searched for in order to ensure that the generated document comprises values from the current audience layer or primary inheritance layer only.

Figure 4:
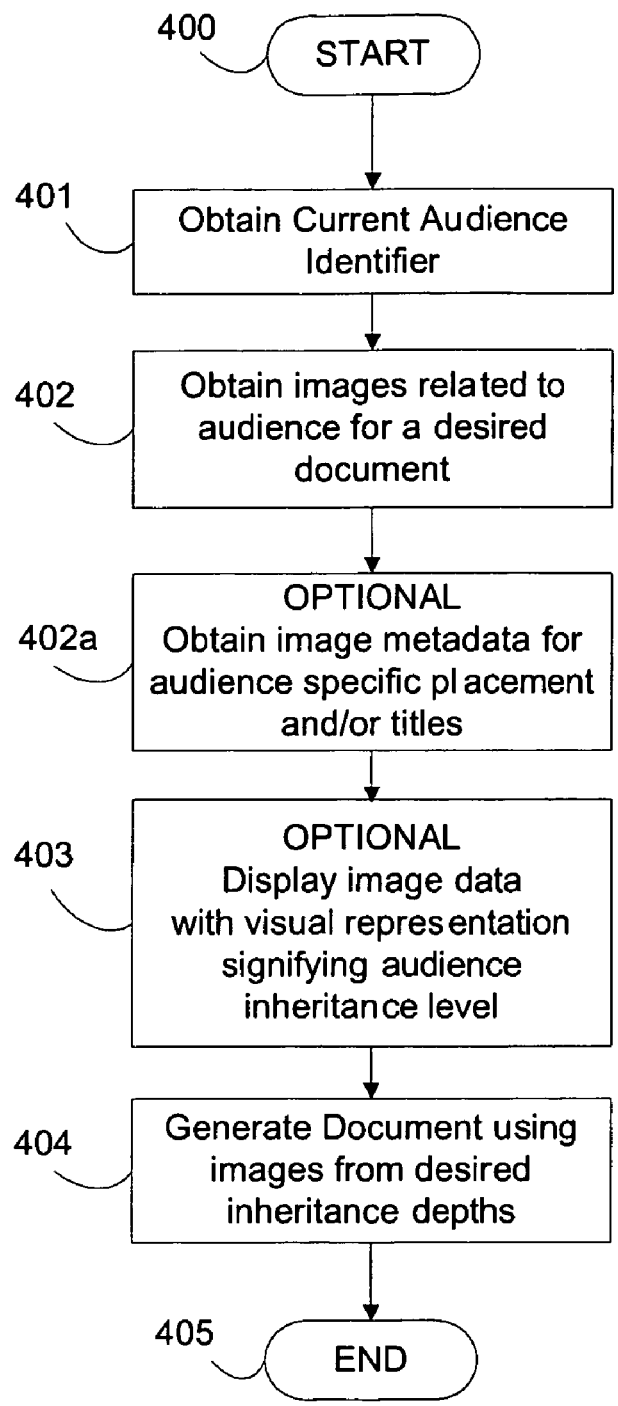
FIG. 4 illustrates an interface for determining image choice across a set of audience-specific documents.

Once the audience hierarchy is set up, entry and edit of data including images occurs in one or more embodiments of the invention after selecting a given audience identifier for interaction with the system. FIG. 4 illustrates a method for determining image choice across a set of audience-specific documents. The audience identifier may be entered manually or automatically from the user or computer associated with a user at 401. The audience identifier may specify the language, or the language and country, or the language, country and region, or the language, region and culture, or the culture and regulatory area or any other combination of audience identifying values. The image data is obtained for a desired output document and audience at 402. The image metadata including positioning and/or titling or any other descriptive metadata is obtained at 402a. The image data is optionally displayed to the user with a visual representation signifying the audience inheritance level of the data with respect to the current audience identifier at 403. This is the case when the user is using the data entry and edit application. The image data is not shown in one or more embodiments of the invention with any indication as to the inheritance level in final output documents. Certain portions of the data entry and edit application may show more than one audience data set simultaneously for rapid viewing of multiple audiences. Optionally, selecting images to use for given audiences and editing image metadata values, importing and exporting and other operations on specific audience layers such as search with audience operator functions may occur after the data is displayed in the system. At least one document is then generated for each audience desired and may be generated in multiple media output formats at 404. The process ends when the user is satisfied that the documents have been correctly generated or at any other time at 405.

Entry of data for a given audience may comprise entering a small amount of data if the audience may be based extensively on another audience. For example in FIG. 2 any of the images in row 204 may be changed in place in order to alter the image choice in the given audience even though the audience may not be the audience associated with the current audience identifier. Metadata may be altered for the image by double-clicking on the image for example. Any other method of editing images and associated metadata including use of object editors is in keeping with the spirit of the invention.

FIG. 3 illustrates the audience layer operator for searching multiple audiences. Keyword searching may be utilized in one or more embodiments to search only the current audience layer and the primary inherited audience layer. This allows for searching in what will be the generated document data only. Other embodiments of the invention allow for the level in which to keyword search to be set to any desired level. In multi-audience data sets, use of an "is NULL" operator when searching returns non-lookup fields that have all associated audience inheritance levels set to NULL or lookup fields that do not link to a sub-table. Using this method it is possible to find null image records or image metadata records and correct them before publication. One or more embodiments of the invention may comprise complete control over the exact layer in which to search for NULL values using a bit flag in the search. For a three level inheritance embodiment, there are 8 permutations involving a NULL value in at least one of the layers, instead of making the user calculate the proper mask, the Current Audience Layer mask can be logical ORed with the Primary Audience Layer Mask or the Secondary Audience Layer Mask in order to create the desired search combination. In addition, predefined audience layer operators may also be used comprising "has value" as per row 1 of FIG. 3, "is missing value" as per row 2, "inherits primary" as per row 3, "inherits secondary" as per row 4, "inherits any" as per row 5, and "does not inherit" as per row 6. These predefined masks save the user from generating a bit mask for searching by hand. "Has value" and "is missing value" are complementary functions used to determine if the current audience layer comprises a value or whether the converse is true. For lookup fields these functions are used in order to check for values or missing values across the set of all links. "Inherits primary" returns a match when the current audience layer inherits a value from either the primary or secondary audience layer and "inherits secondary" returns a match when the current audience layer inherits from only the secondary audience layer, while "inherits any" returns a match when either of the previous two cases is true. "Does not inherit" returns a match when there is a current audience layer value for non-lookup fields or when all layers are null.

One or more embodiments of the invention may utilize database tables or memory structures or any combination of tables or structures in storing data associated with audiences or data relating to the audience metadata. Audience specific documents may be generated for publication by obtaining an audience identifier from an audience order table or structure. The audience identifier specifies the actual audience to utilize when accessing a data attribute table or data table comprising values for at least one audience. The value specific to a given audience is obtained from the data table using the first audience order identifier and the reference identifier of the value from a main data table. If the value exists, it is returned. If the value does not exist for a given audience order identifier and reference, then the audience order table may be accessed in order to find the next audience that may comprise the value. The next position found in the audience order table for a given audience identifier is utilized in order to access the data table. The processing repeats until a value is found or a stop flag is found in which case no value is supplied. Stop flags may be utilized in the audience hierarchy to allow for a user interface data entry and editing application to show all inherited values and yet allow for the non-publication of inherited values past a set level of inheritance in a generated document. Although the system utilized for data entry and edit may show secondary inheritance audience layers in red for example, the generated document itself may not be generated using any secondary inheritance values in one or more embodiments of the invention.

While the invention herein disclosed has been described by means of specific embodiments and applications thereof, numerous modifications and variations could be made thereto by those skilled in the art without departing from the scope of the invention set forth in the claims.

What is claimed is:

1. A computer system for utilizing a multi-layered data model for determining image choice across a set of audience-specific documents comprising:

a data storage medium storing instructions and a computer configured to process said instructions comprising:

obtaining a current audience identifier from a user, wherein said current audience identifier is associated with a current audience comprising a group of document consumers;

obtaining an audience inheritance hierarchy for said current audience identifier, wherein said audience inheritance hierarchy comprises a first audience identifier and a second audience identifier, wherein said second audience identifier is not determined by said first audience identifier;

obtaining image data for said current audience identifier from said data storage medium;

determining that said image data for said current audience identifier does not exist, obtaining inherited image data associated with said first audience identifier;

when that said image data associated with said current audience identifier and said inherited image associated with said first audience identifier do not exist, obtaining inherited image data associated with said second audience identifier;

wherein the obtaining inherited image data associated with the first and second audience identifiers corresponding to a parent audience of said current audience using said audience inheritance hierarchy, and the existence of inherited image data associated with said first audience identifier is checked before the existence of inherited image data associated with said second audience identifier is checked; and generating a document comprising said obtained inherited image data corresponding to said current audience and said parent audience.

2. The computer system of claim 1 wherein said instructions further comprise:
obtaining image metadata for said current audience identifier and inherited image metadata associated with at least one of said first audience identifier and said second audience identifier; and,
utilizing said image metadata for image placement based on said current audience identifier.

3. The computer system of claim 1 wherein said instructions further comprise:
displaying said obtained inherited image data having a visual representation that signifies an audience inheritance level.

4. The computer system of claim 1 wherein said instructions further comprise:
searching for an image data value utilizing an audience layer operator for specifying a set of inheritance levels in which to perform a search.

5. The computer system of claim 1 wherein said instructions further comprise:
not publishing data associated with a secondary audience identifier.

6. The computer system of claim 1 wherein said instructions further comprise:
editing an image value that signifies association with said current audience other than said current audience identifier wherein said image value is set to a new image value and displayed with a visual representation denoting association with said current audience.

7. The computer system of claim 1 wherein said instructions further comprise:
editing an image value that signifies association with said current audience identifier wherein said image value is set to a new image value; and,
generating a second document comprising audience data corresponding to another audience identifier wherein said new image value is obtained without altering said image value more than one time.

8. The computer system of claim 7 wherein said generating said second document further comprises formatting said second document for a desired media type and wherein said second document requires no alteration when said image value is altered to said new image value.

9. The computer system claim 1 wherein said process instructions further comprise:
outputting said document to a plurality of media types.

10. The computer system of claim 9 wherein a media type of said plurality of media types is markup.

11. The computer system of claim 9 wherein said a media type of said plurality of media types is paper.

12. The computer system of claim 1 wherein said instructions further comprise:
obtaining information from an environment variable on a computer associated with said user.

13. The computer system of claim 1 wherein said instructions further comprise:
obtaining information from a browser session variable.

14. A computer system for utilizing a multi-layered data model for determining image choice across a set of audience-specific documents comprising:
a data storage medium storing instructions; and
a computer configured to process said instructions comprising:
obtaining a current audience identifier from a user, said current audience identifier describing a current audience comprising a group of document consumers;
obtaining an audience inheritance hierarchy for said current audience identifier, wherein said audience inheritance hierarchy comprises a first audience identifier and a second audience identifier corresponding to a parent audience of said current audience, wherein said second audience identifier is not determined by said first audience identifier;
obtaining image data for said current audience identifier from said data storage medium;
determining that said image data for said current audience identifier does not exist, obtaining inherited image data associated with said first audience identifier;
when said image data associated with said current audience identifier and said inherited image associated with said first audience identifier do not exist, obtaining inherited image data associated with said second audience identifier;
obtaining image metadata for said current audience identifier and inherited image metadata from the parent audience of said current audience included in said audience inheritance hierarchy of said current audience identifier; and,
generating a document comprising said obtained inherited image data corresponding to said current audience and said parent audience by utilizing said image metadata and inherited image metadata for image placement based on said current audience and said parent audience.

15. The computer system of claim 14 wherein said instructions further comprise:
displaying said obtained image data having a visual representation that signifies an audience inheritance level.

16. The computer system of claim 14 wherein said instructions further comprise outputting said document to a plurality of media types.

17. The computer system of claim 16 wherein a media type of said plurality of media types is markup.

18. The computer system of claim 16 wherein a media type of said plurality of media types is paper.

19. A computer system for utilizing a multi-layered data model for determining image choice across a set of audience-specific documents comprising:

a data storage medium storing instructions; and a computer configured to process said instructions comprising:

obtaining a current audience identifier, said current audience identifier identifying a current audience comprising a group of document consumers;

obtaining an audience inheritance hierarchy associated with said current audience identifier from said data storage medium, wherein said audience inheritance hierarchy comprises a first audience identifier and a second audience identifier corresponding to a parent audience of said current audience, wherein said second audience identifier is not determined by said first audience identifier;

obtaining image data associated with said current audience identifier from said data storage medium;

determining that said image data for said current audience identifier does not exist, obtaining inherited image data associated with said first audience identifier from said data storage medium using the audience inheritance hierarchy;

when said image data associated with said current audience identifier and said inherited image data associated with said first audience identifier do not exist, obtaining inherited image data associated with said second audience identifier from said data storage medium;

obtaining image metadata for said current audience identifier and inherited image metadata from the parent audience of said current audience included in said audience inheritance hierarchy of said current audience identifier; and, displaying said obtained inherited image data having a visual representation that signifies an audience inheritance level.

20. The computer system of claim 19 wherein said instructions further comprise:

editing an image value that signifies association with said audience other than said current audience identifier wherein said image value is set to a new image value and displayed with a visual representation denoting association with said current audience.

* * * * *